(12) United States Patent
Murakami et al.

(10) Patent No.: US 11,962,734 B2
(45) Date of Patent: Apr. 16, 2024

(54) IMAGE PROCESSING APPARATUS COMPRISING IMAGE READER FOR READING DOCUMENT ACCORDING TO SCAN SETUP DATA, IMAGE PROCESSING PROGRAM STORING MEDIUM, AND IMAGE PROCESSING SYSTEM

(71) Applicant: SHARP KABUSHIKI KAISHA, Sakai (JP)

(72) Inventors: Kohichi Murakami, Sakai (JP); Yasuhiro Nakai, Sakai (JP); Yasutomo Hayano, Sakai (JP); Emiko Matsuo, Sakai (JP); Masao Saeda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/968,776

(22) Filed: Oct. 18, 2022

(65) Prior Publication Data

US 2023/0120527 A1 Apr. 20, 2023

(30) Foreign Application Priority Data

Oct. 19, 2021 (JP) ................... 2021-170670

(51) Int. Cl.
*H04N 1/00* (2006.01)
*H04N 1/32* (2006.01)

(52) U.S. Cl.
CPC ..... *H04N 1/32406* (2013.01); *H04N 1/00225* (2013.01); *H04N 1/00411* (2013.01); *H04N 2201/0094* (2013.01)

(58) Field of Classification Search
CPC .......... H04N 1/32406; H04N 1/00225; H04N 1/00411
USPC .................................................. 358/1.15, 505
See application file for complete search history.

(56) References Cited

U.S. PATENT DOCUMENTS

| | | | | |
|---|---|---|---|---|
| 2004/0004733 A1* | 1/2004 | Barker | ...................... | H04N 1/38 358/453 |
| 2005/0071738 A1* | 3/2005 | Park | .................... | H04N 1/00355 715/236 |
| 2007/0291318 A1* | 12/2007 | Wang | ................. | H04N 1/00358 358/1.15 |

FOREIGN PATENT DOCUMENTS

JP 2001-358866 A 12/2001

* cited by examiner

*Primary Examiner* — Jamares Q Washington
(74) *Attorney, Agent, or Firm* — ScienBiziP, P.C.

(57) ABSTRACT

In an image processing system, when a user logs in to an image processing apparatus to use a scanning service, the image processing apparatus transmits login information to a relay server, and the relay server transmits scan setup data and destination address data to the image processing apparatus. The image processing apparatus prescans a document to identify a document format, and automatically sets scan setup data (properties), based on the identified format and according to the sent scan setup data, so as to execute scanning.

4 Claims, 15 Drawing Sheets

PORTAL SCREEN (FUNCTION SELECTION) 74

SERVICE SELECTION SCREEN 80

FIG. 6

CORPORATE LOGIN SCREEN 88

ENTER USER NUMBER AND PRESS "NEXT" — 90

EXIT — 98

USER NUMBER — 94

[keyboard] — 92

NEXT — 96

FIG. 7

SCAN SCREEN 100

PLACE DOCUMENT AND PRESS "DOCUMENT LOADING" — 102

EXIT — 116

104 — COLOR MODE / FULL COLOR

106 — FILE SAVING FORMAT / PDF

108 — RESOLUTION / STANDARD

110 — DOCUMENT SIZE / AUTO A4

DIRECTION OF DOCUMENT PLACEMENT — 112

NUMBER OF SHEETS READ / SHEETS

TOTAL AMOUNT / YEN

DOCUMENT LOADING — 114

FIG. 9

SCAN SETUP DATA 126a

| FORMAT | COLOR MODE | FILE FORMAT | RESOLUTION |
|---|---|---|---|
| FORMAT A | MONOCHROME FIXED | PDF | 100-300dpi FIXED |
| FORMAT B | COLOR FIXED | HIGHLY COMPRESSED PDF | 400dpi FIXED |
| FORMAT C | COLOR FIXED | JPEG | 300-400dpi FIXED |
| ANSWER SHEET A | MONOCHROME FIXED | PDF or HIGHLY COMPRESSED PDF | 100-300dpi FIXED |
| ANSWER SHEET B | MONOCHROME FIXED | PDF | 100-300dpi FIXED |
| FREE (TEXT) | MONOCHROME FIXED | PDF | 100-300dpi FIXED |
| FREE (IMAGE) | COLOR FIXED | JPEG | 300-400dpi FIXED |
| ⋮ | ⋮ | ⋮ | ⋮ |

FIG. 10

FORMAT A: CONCERNING DOCUMENT

YY-MONTH,
ZZ-DAY, 20XX

RE: QQQQ

ADD FORMAT
IDENTIFICATION
CODE

FIG. 11

FORMAT B: CONCERNING DOCUMENT AND IMAGE

YY-MONTH,
ZZ-DAY, 20XX

RE: RRRR

ADD FORMAT
IDENTIFICATION
CODE

FORMAT C: CONCERNING IMAGE

FIG. 13

DESTINATION ADDRESS DATA 126b

| DESTINATION DETERMINATION FORMAT INFORMATION | MAILING LIST | DESTINATION MAIL ADDRESS | DOWNLOAD CONDITION |
|---|---|---|---|
| FORMAT A; FORMAT B; FORMAT C; FREE (TEXT) | WIDE-AREA SALES DEPT. | AAA111@mail.com<br>AAA112@mail.com<br>AAA113@mail.com<br>AAA114@mail.com<br>AAA115@mail.com<br>AAA116@mail.com | PASSWORD |
| FORMAT A; FREE (TEXT) | URBAN SALES DEPT. | BBB111@mail.com<br>BBB112@mail.com | PASSWORD |
| FORMAT A; FREE (TEXT) | REGIONAL SALES DEPT. | CCC111@mail.com<br>CCC112@mail.com | PASSWORD |
| ALL | PRODUCTION ENGINEERING DEPT. | DDD111@mail.com<br>DDD112@mail.com<br>DDD113@mail.com | LOGIN INFORMATION |
| ⋮ | ⋮ | ⋮ | ⋮ |
| FORMAT A; FREE (TEXT) | OFFICE 1 (ESTIMATION PROCESSING) | PPP111@mail.com | EQUIPMENT INFORMATION |
| FORMAT A; FREE (TEXT) | OFFICE 2 (APPLICATION PROCESSING) | QQQ111@mail.com | EQUIPMENT INFORMATION |
| ⋮ | ⋮ | ⋮ | ⋮ |
| FREE (TEXT) | FOR DISTRIBUTION TO CUSTOMERS | WWW111@mail.com | NO PASSWORD |
| ⋮ | ⋮ | ⋮ | ⋮ |

PORTAL SCREEN (SERVICE SELECTION) 138

CORPORATE LOGIN SCREEN 88A

IMAGE PROCESSING APPARATUS COMPRISING IMAGE READER FOR READING DOCUMENT ACCORDING TO SCAN SETUP DATA, IMAGE PROCESSING PROGRAM STORING MEDIUM, AND IMAGE PROCESSING SYSTEM

BACKGROUND OF THE INVENTION

Field of the Invention

The present disclosure relates to an image processing apparatus, an image processing program storing medium, and an image processing system. In particular, this disclosure relates to an image processing apparatus, an image processing program storing medium, and an image processing system, that provide, for example, a scanning service by using an image processing apparatus (a multifunction machine) installed in a public space, etc.

Description of the Background Art

In a conventionally disclosed technique, an image forming apparatus has a configuration in which a format paper with setup conditions written thereon and documents to be read following the format paper are set in an automatic document reader, the setup conditions written on the format paper are read, and the documents following thereto are copied based on the read setup conditions. In this image forming apparatus, an email address, etc., of an operator is written in an address entry field of the format paper, and email is transmitted to the address written on the format paper when copying is completed, trouble occurs, and so on.

The conventional technique not only requires time-consuming procedures such as the use of format paper, but also may result in erroneous transmissions if the email address is incorrectly written.

The object of the present disclosure is to provide novel, image processing apparatus, image processing program storing medium, and image processing system.

Another object of the present disclosure is to provide an image processing apparatus, an image processing program storing medium, and an image processing system, that can reduce as much as possible user's effort in a scanning service using an image processing apparatus.

SUMMARY OF THE INVENTION

To solve the above issues, the present disclosure adopts the following configuration. Note that reference signs and supplementary explanations, etc., in parentheses, indicate correspondence relationships with embodiments described so as to facilitate easy understanding of the present disclosure, and do not limit the present disclosure in any way.

The first aspect of disclosure provides an image processing apparatus that provides a scanning service to a user, the image processing apparatus comprising a user information receiver that receives user information of the user; a scan setup data storage that stores scan setup data corresponding to the user information and predetermined document format information; a document format information detector that detects document format information; and an image reader that reads a document and generates scan data, in accordance with the scan setup data that is based on the user information and the document format information, when the user information is received and the document format information is detected by the document format information detector.

In the first aspect of disclosure, the image processing apparatus is an image processing apparatus that provides a scanning service to a user. The user information receiver receives user information of the user. The scan setup data storage stores scan setup data. The scan setup data is configured to set a parameter or property for scanning, correspondingly to a user indicated by the user information and the predetermined document format information. The document format information detector detects the format information of a document. When the user information is received and the document format information is detected by the document format information detector, the necessary scan setup data is read out from the scan setup data storage and set, based on, e.g., the document format information. The image reader reads the document and generates scan data, in accordance with the scan setup data set in this way.

According to the first aspect of disclosure, the scan setup data is automatically set based on the document format information, which makes it possible to reduce the time and effort of the user who gets the scanning service.

The second aspect of disclosure depends on the first aspect of disclosure, and provides the image processing apparatus further comprising a destination address data storage that stores a destination address of the scan data corresponding to a user indicated by the user information; and a first transmitter that transmits the scan data generated by the image reader to a destination indicated by the destination address data storage.

In the second aspect of disclosure, the destination address data storage stores the destination address of the scan data corresponding to the user indicated by the user information, and the first transmitter transmits the data to the destination indicated by the destination address data storage.

According to the second aspect of disclosure, the scan data is automatically transmitted to the destination accordingly to the destination address data, which reduces the possibility of erroneous transmission.

The third aspect of disclosure depends on the first or second aspect of disclosure, and provides the image processing apparatus further comprising a second transmitter that transmits the scan data generated by the image reader to a server, wherein the server transmits the scan data sent from the second transmitter to the destination.

In the third aspect of disclosure, the second transmitter transmits the scan data generated by the image reader to the server, and the server transmits the received scan data to the destination.

The fourth aspect of disclosure depends on any one of the first through third aspects of disclosures, and provides the image processing apparatus wherein the document format information detector detects the document format information based on scan data obtained by prescanning the document.

Pre-scanning the document by the image reader makes it possible to read, for example, a format identification code provided recognizably on the document, which allows the document format information detector to identify the format of the document.

The fifth aspect of disclosure provides a non-transitory computer-readable medium having stored thereon an image processing program that is executed by a processor of an image processing apparatus that provides a scanning service to a user, the image processing program making the processor function as a user information receiver that receives user information of the user; a scan setup data storage that stores scan setup data corresponding to user information and predetermined document format information; a document format information detector that detects document format information; and an image reader that reads a document and generates scan data, in accordance with the scan setup data that is based on the user information and the document format information, when the user information is received and the document format information is detected by the document format information detector.

The sixth aspect of disclosure provides an image processing system comprising an image processing apparatus and a server, that provide a scanning service to a user, wherein the image processing apparatus is provided with a user information receiver that receives user information of the user, the server is provided with a scan setup data storage that previously sets scan setup data corresponding to a user, the image processing apparatus transmits the user information to the server, the server transmits the scan setup data corresponding to the user indicated by the user information to the image processing apparatus, and wherein the image processing apparatus is further provided with a document format information detector that detects document format information; and an image reader that reads a document and generates scan data, in accordance with the scan setup data that is based on the document format information detected by the document format information detector.

The sixth aspect of disclosure is the image processing system comprising an image processing apparatus and a server, that provide a scanning service to a user, wherein the image processing apparatus is provided with a user information receiver that receives user information of the user, the server is provided with a scan setup data storage that previously sets scan setup data corresponding to a user, the image processing apparatus transmits the user information to the server, the server transmits the scan setup data corresponding to the user indicated by the user information to the image processing apparatus, and the document format information detector detects the format information of the document. The image processing apparatus reads out the necessary scan setup data from the scan setup data storage and sets the scan setup data, based on the format information. The image reader reads the document and generates scan data, in accordance with the scan setup data set in this way.

According to the sixth aspect of disclosure, the same effects as the first aspect of disclosure can be expected.

The seventh aspect of disclosure depends on the sixth aspect of disclosure, and provides the image processing system wherein the image processing apparatus is further provided with a scan data transmitter that transmits the scan data generated by the image reader to the server, the server is provided with a destination address data storage that previously sets destination address data corresponding to a user, and the server saves the scan data transmitted from the scan data transmitter at a save location and transmits a Uniform Resource Locator (URL) address of the save location to a destination indicated by the destination address data.

In the seventh aspect of disclosure, the scan data transmitter transmits the scan data generated by the image reader to the server. On the other hand, the server is provided with the destination address data storage that previously sets destination address data corresponding to a user, and the server saves the scan data transmitted from the scan data transmitter at the save location and transmits the URL address of the save location to a destination indicated by the destination address data.

According to the seventh aspect of disclosure, the same effect as the second aspect of disclosure can be expected.

In the scanning service, it is possible, for example, to automatically set parameters (properties) for a scanning operation, and thereby to reduce the time and effort of the user, required to perform the scanning operation on the image processing apparatus.

The foregoing and other objects, features and advantages of this disclosure will become more apparent from the detailed description of the following embodiments, given with reference to drawings.

BRIEF DESCRIPTION OF THE DRAWINGS

FIG. 6 is a schematic illustration showing one example of a corporate login screen.

FIG. 7 is a schematic illustration showing one example of a scan screen.

FIG. 9 is a schematic illustration showing one example of a scan setup data shown in FIG. 8.

FIG. 10 is a schematic illustration showing one example of Format A.

FIG. 11 is a schematic illustration showing one example of Format B.

FIG. 13 is a schematic illustration showing one example of a destination address data shown in FIG. 8.

DESCRIPTION OF THE PREFERRED EMBODIMENTS

First Embodiment

Figure 1:
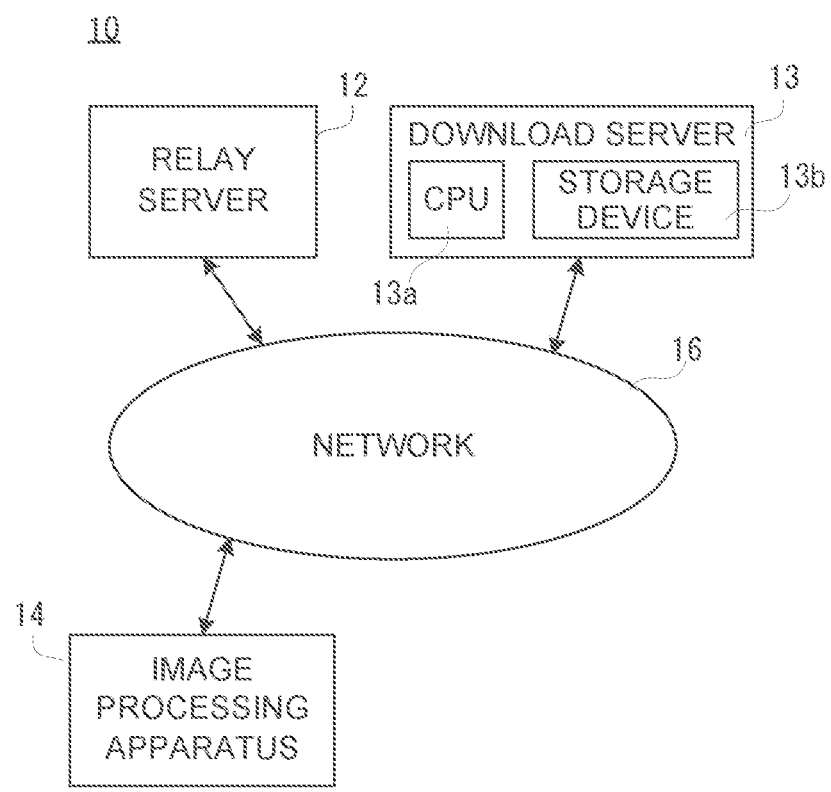
FIG. 1 is a schematic illustration showing the configuration of an image processing system that is one embodiment of the present disclosure.

Referring to FIG. 1, an image processing system 10 according to one embodiment of the present disclosure includes a relay server (information processing equipment) 12, a download server (information processing equipment) 13 and an image processing apparatus 14, wherein the relay server 12, the download server 13 and the image processing apparatus 14 are communicatively connected to each other via a network 16 such as the Internet or LAN.

The relay server 12 is a general-purpose server and is equipped with components described below with reference to FIG. 3. The download server 13 is a server functioning for the relay server 12 to store scan data, and is equipped with CPU 13a and a storage device (RAM) 13b, as well as a communicator, etc.

The image processing apparatus 14 is a multifunction peripheral (MFP) having functions relating to copy, printer, scanner, and facsimile (FAX). In this embodiment, the image processing apparatus 14 is installed in a public space and used by an unspecified number of persons (users). An exemplary public space may be a store such as a supermarket, a restaurant or a convenience store; a public facility such as a train station, a bus terminal, an airport, a public office or a library; and so on.

Figure 2:
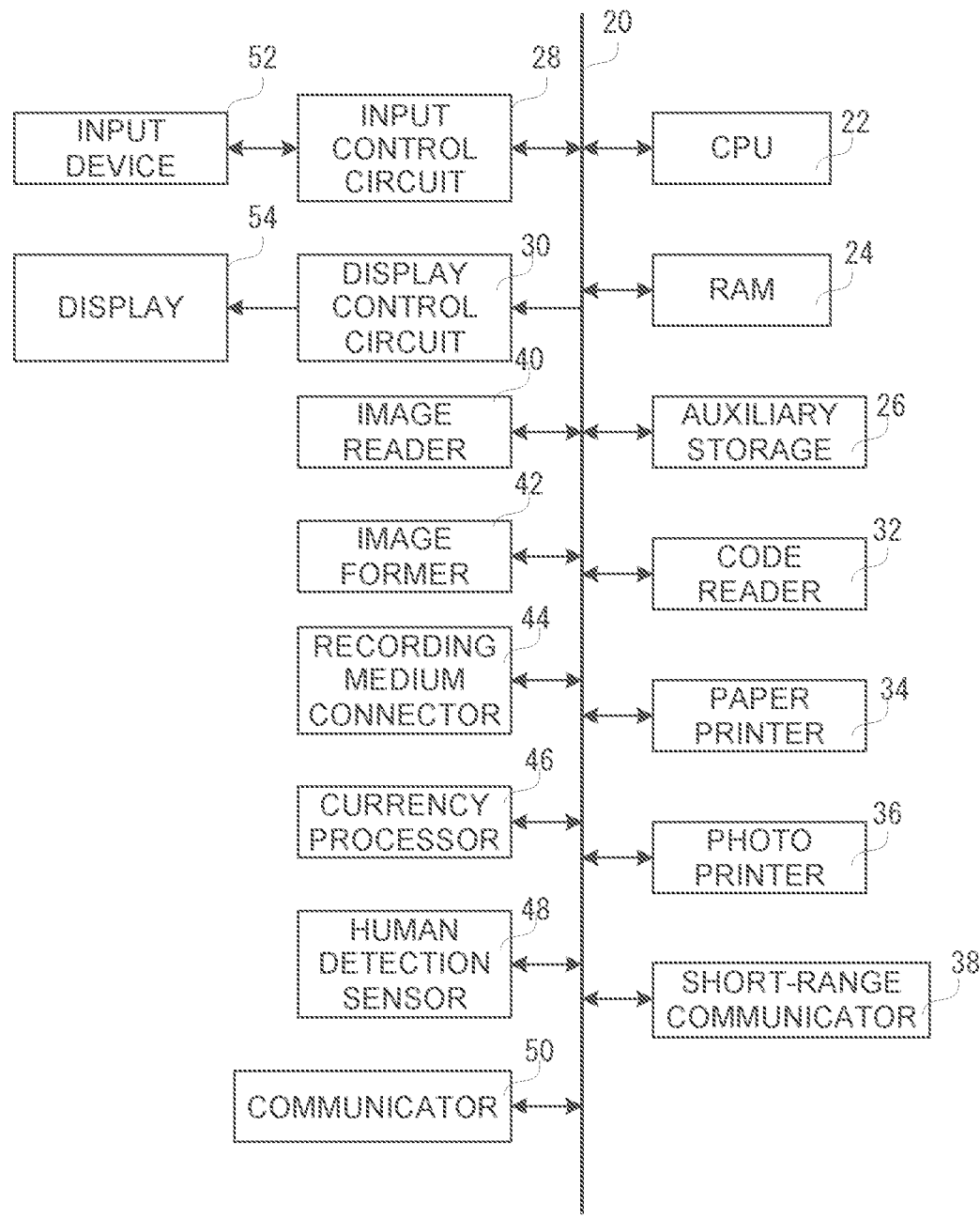
FIG. 2 is a block diagram showing the electrical configuration of an image processing apparatus shown in FIG. 1.

FIG. 2 is a block diagram showing the electrical configuration of the image processing apparatus 14 shown in FIG. 1. Referring to FIG. 2, the image processing apparatus 14 includes CPU 22. The CPU 22, also called a processor or the like, is connected via a bus 20 with RAM 24, an auxiliary storage 26, an input control circuit 28, a display control circuit 30, a code reader 32, a paper printer 34, a photo printer 36, a short-range communicator 38, an image reader 40, an image former 42, a recording medium connector 44, a currency processor 46, a human detection sensor 48 and a communicator 50. An input device 52 is connected to the input control circuit 28, and a display 54 is connected to the display control circuit 30.

The CPU 22 is responsible for the overall control of the image processing apparatus 14. The RAM 24 is a main memory of the CPU 22 and is used as a work area and a buffer area.

The auxiliary storage 26 is an auxiliary storage device of the image processing apparatus 14, which stores a control program, various data, etc., used by the CPU 22 to control the operation of each component of the image processing apparatus 14. Note that HDD or other memory is used as the auxiliary storage 26. The above configuration is also true for an auxiliary storage 62 described later.

The input device 52 is a device for accepting an input operation by a user (user operation) and includes, for example, a touch panel and hardware operation buttons or operation keys (hardware keys). The touch panel is a general-purpose touch panel and can adopt any input systems, such as an electrostatic capacitive system, an electromagnetic induction system, a resistive film system, or an infrared ray system. The touch panel may be placed on the screen face of the display 54, or may be installed separately from the display 54. Alternatively, a touch display may be provided, in which the touch panel is integrally formed with the display 54. In the case where the touch panel is placed on the screen face of the display 54, the display 54 is configured to display a graphical user interface (GUI) including software keys such as icons, and receive user operations through the GUI.

Note that a software key is, for example, a key or icon that is reproduced by a software on the screen face of the display. In contrast, a hardware key is a key or pushbutton provided as a physical device.

The input control circuit 28 outputs operation signals or operation data to the CPU 22 in response to the operation of the input device 52. For example, the input control circuit 28 applies necessary voltage, etc., to the touch panel of the input device 52 and, when a touch operation (touch input) is performed within the touch valid range of the touch panel, outputs touch coordinate data indicating the position of the touch input to the CPU 22. The input control circuit 28 also outputs operation signals or operation data to the CPU 22 in response to the operation of operation buttons or hardware keys of the input device 52.

The display control circuit 30 includes GPU, VRAM, and so on. With the instruction from the CPU 22, the GPU uses image generation data stored in the RAM 24 to generate display image data in the VRAM, which is used for displaying various screens on the display 54, and outputs the generated display image data to the display 54. An LCD display, an EL display, etc., can be used as the display 54.

The code reader 32 includes, for example, a laser scanner or a camera, and can read a code or the like attached to a product, card, receipt, or the like. Codes that can be read by code reader 32 include a bar code (one-dimensional bar code) or a two-dimensional code (e.g., a QR code (registered trademark), a micro QR code, DataMATRIX, MaxiCODE, VeriCODE, etc.).

The paper printer 34 is, for example, a thermal printer or a dot impact printer, and issues a paper strip on which an image of a receipt, acknowledgment, journal, or coupon ticket, etc., is printed. Specifically, the paper printer 34 prints various character strings, images, code patterns (e.g., bar codes), etc., on paper rolls and discharges the printed paper pieces.

The photo printer 36 is, for example, a dye sublimation printer or an inkjet printer, and prints an image on a paper for photographs (photo paper). The photo paper printed by the photo printer 36 is ejected on a photo ejector provided on the lateral side of the image processing apparatus 14. Image data for forming images on the paper is provided as image data stored in a recording medium connected to the recording medium connector 44, or image data transmitted from an external computer.

The short-range communicator 38 performs wireless contactless data communication with a communication target, such as an IC card (ID card, membership card, employee ID card, etc.) or a user terminal, in accordance with, for example, a communication standard such as ISO/IEC18092 (so-called NFC (Near Field Communication) and so on. The communication range of the short-range communicator 38 is from several centimeters to several meters. For example, the short-range communicator 38 transmits a signal (read command) to the communication target, that instructs reading out of data stored in the communication target. In this case, the communication target transmits the desired data to the short-range communicator 38 as a response to the read command. The short-range communicator 38 also transmits, to the communication target, data to be written into the communication target (write data) and a signal instructing writing thereof (write instruction). In this case, the communication target writes (stores) the received write data in the storage section of the communication target in accordance with the write instruction.

The image reader 40 is equipped with a light source, a plurality of mirrors, an imaging lens, a line sensor, and so on. The image reader 40 exposes the surface of a document by means of the light source and guides a reflected light from the document surface to an imaging lens by means of the mirrors. The reflected light is then imaged on the light receiving element of the line sensor by the imaging lens. The line sensor detects the luminance and chromaticity of the reflected light imaged on the light receiving element, and generates read image data based on the image on the document surface.

The image former (printing device) 42 is a general-purpose laser printer, equipped with a photosensor, an electrostatic charger, an exposure device, a developing device, a transfer device, a fusing device, and the like, and prints an image (print image) corresponding to print image data on a recording paper (paper), etc. The image former 42 is not limited to a laser printer and may also be an inkjet printer.

Although a detailed description is omitted, the image former 42 is equipped with a color printing function, and constitutes an image forming station including a photosensor, an electrostatic charger, a developing device, etc., for each of Y (yellow), M (magenta), C (cyan) and K (black).

The recording medium connector 44 includes mounting portions (e.g., drive and memory slots) for attaching various types of recording media. For example, recording media include an optical disk (e.g., CD-R, DVD-R and BD-R), a flash memory (e.g., USB memory, SD memory cards and memory sticks), and so on. The optical disk is mounted in the drive and the flash memory is mounted in the memory slot.

Currency processor 46 includes a currency feed portion and a coin return port. The currency feed portion includes a coin feed slot, a bill feed slot, and a change return lever. Coins fed in through the coin feed slot and bills fed in through the bill feed slot are classified by types and stored respectively in designated currency storage areas. The currency storage area includes a storage area for coins and a storage area for bills. When coins or bills are fed in, an amount of fed money is calculated according to the type and number of coins stored in the coin storage area and the type and number of bills stored in the bill storage area. When the image processing apparatus 14 performs a predetermined service, etc., the cost corresponding to the details of service is subtracted from the amount of fed money, and the balance of the amount of fed money is calculated. When the change return lever is handled, coins or bills are returned according to the balance of the fed money amount. The coins are returned through the coin return port, and the bills are returned through the bill feed slot.

Human detection sensor 48 is a sensor for detecting whether a person (user) exists in a predetermined area (zone) set in front of the image processing apparatus 14, and is, for example, a distance sensor. For example, an infrared sensor, an ultrasonic sensor, a laser distance sensor, etc., is used as the distance sensor. The distance sensor outputs distance data to the CPU 22. The CPU 22 determines whether a person exists in the predetermined area in front of the image processing apparatus 14, depending on whether the distance indicated by the distance data output from the human detection sensor 48 is within a predetermined distance defining the predetermined area.

The communicator 50 is a communication circuit for connection to the network 16. The communicator 50 includes a wired communication circuit or a wireless communication circuit, and, in accordance with instructions from the CPU 22, communicates with external computers (external terminals), such as the relay server 12, the download server 13, etc., via the network 16, based on a communication method conforming to a known telecommunications standard. The communicator 50 can also communicate directly with the other external computer, such as a portable terminal, wirelessly (by, e.g., an infrared method, a WiFi (registered trademark) method, or a Bluetooth (registered trademark) method), without using the network 16.

Note that the electrical configuration of the image processing apparatus 14 shown in FIG. 2 is merely a non-limiting example.

Figure 3:
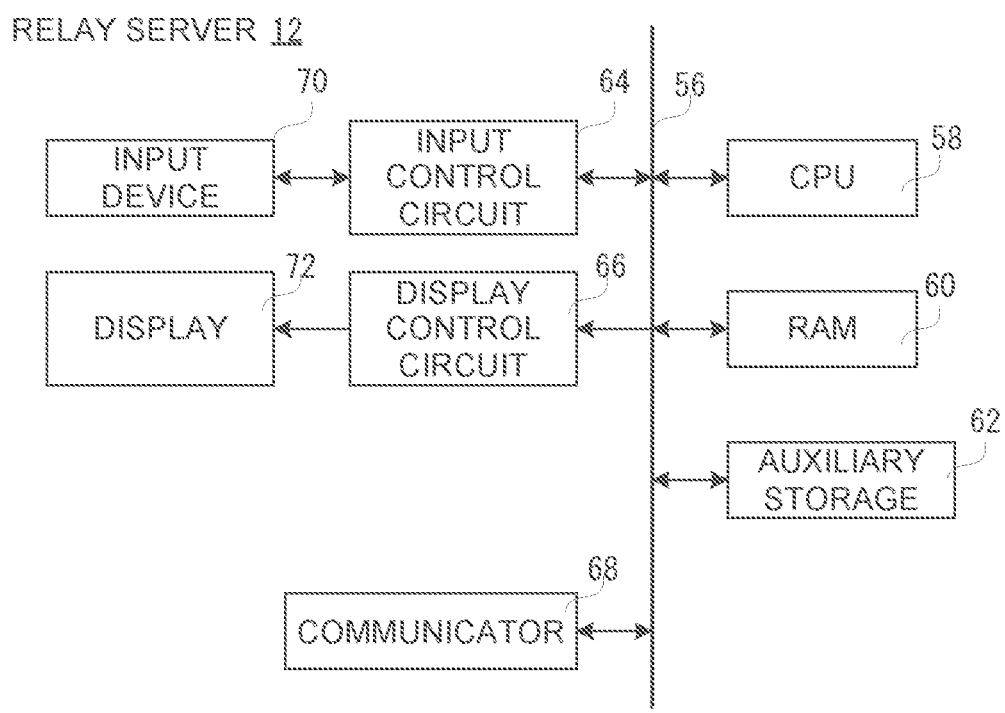
FIG. 3 is a block diagram showing the electrical configuration of a server shown in FIG. 1.

FIG. 3 is a block diagram showing the electrical configuration of the relay server 12 shown in FIG. 1. Referring to FIG. 3, the relay server 12 includes CPU 58. The CPU 58, also called a processor or the like, is connected via a bus 56 with RAM 60, an auxiliary storage 62, an input control circuit 64, a display control circuit 66, and a communicator 68. An input device 70 is connected to the input control circuit 64, and a display 72 is connected to the display control circuit 66.

The CPU 58 is responsible for the overall control of the relay server 12. The RAM 60 is used as a work area and a buffer area of the CPU 58. The auxiliary storage 62 is an auxiliary storage device of the relay server 12.

The input control circuit 64 outputs operation signals or operation data to the CPU 58 in response to the operation of the input device 70. For example, the input control circuit 64 applies the necessary voltage, etc., to the touch panel included in the input device 70 and, when a touch operation (touch input) is performed within the touch valid range of the touch panel, outputs touch coordinate data indicating the position of the touch input to the CPU 58. The input control circuit 64 also outputs operation signals or operation data to the CPU 58 in response to the operation of operation buttons or hardware keys of the input device 70.

The display control circuit 66 includes GPU, VRAM, and so on. With the instruction from the CPU 58, the GPU uses image generation data stored in the RAM 60 to generate display image data in the VRAM, which is used for displaying various screens, and outputs the generated display image data to the display 72. An LCD display, an EL display, etc., can be used as the display 72.

The communicator 68 includes wireless communication circuit for connection to the network 16, and, in accordance with instructions from the CPU 58, communicates with external computers, such as the download server 13, the image processing apparatus 14, etc., via the network 16. The communicator 68 can also communicate directly with the other external computer, such as a portable terminal, using a wireless method, etc., similarly to the communicator 50 (FIG. 2) of the image processing apparatus 14. It is also possible to communicate directly with the other external computer, such as the image processing apparatus 14, without using the network 16. The communicator 68 can also perform wireless communication with a cellular phone base station, and realize a voice call with the other terminal device that allows telephone communication.

Note that the electrical configuration of the relay server 12 shown in FIG. 3 is merely a non-limiting example.

As described above, the image processing apparatus 14 receives user operations on the input device 52 through the GUI displayed on the display 54. For example, multiple operation screens (setting screens) used for setting the operating conditions of the image processing apparatus 14 are presented to the user, and a service is provided in accordance with the contents (operating conditions) set on the respective operation screens.

Figure 4:
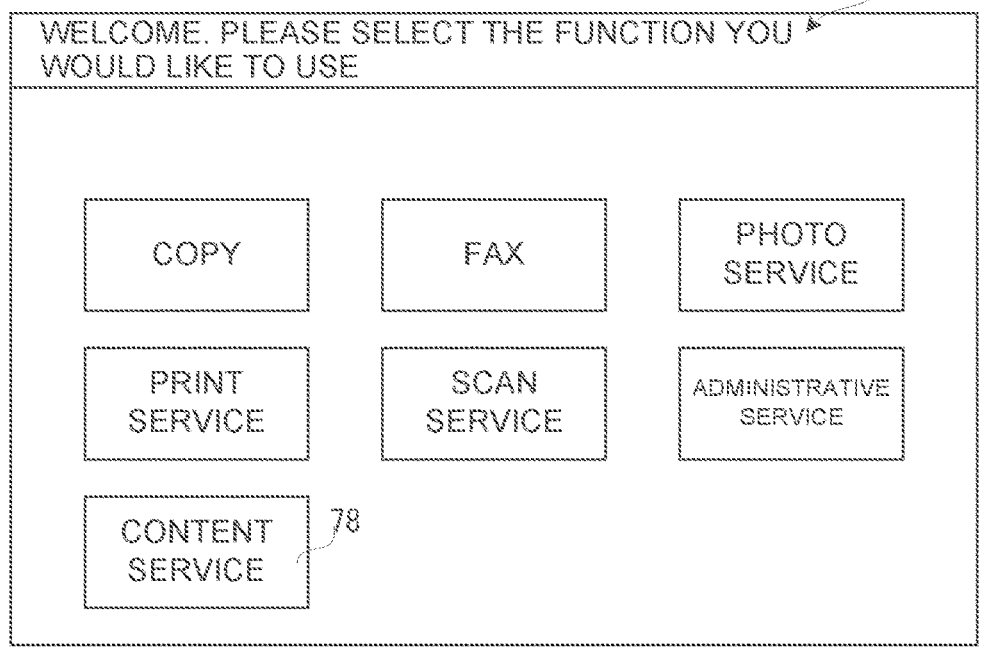
FIG. 4 is a schematic illustration showing one example of a portal screen (function selection).

For example, when the main power supply of the image processing apparatus 14 is turned on and the image processing apparatus 14 is in a standby state ready to execute respective functions, the display 54 displays a portal screen or function selection screen 74 as shown in FIG. 4.

The portal screen 74 is an operation screen for selecting the function to be performed. The portal screen 74 shows a plurality of selection icons serving as software keys, which allows the selection of functions. The portal screen 74 also shows a message 76 indicating that the function can be selected by selecting any of the icons.

Each of the plural selection icons is assigned a service that can be provided by the image processing apparatus 14, such as "Copy," "Fax," "Photo Service," "Print Service," "Scan Service," "Administrative Service" and "Content Service".

Note that "Administrative Service" refers to a print service for printing an administrative certificate. The copy service includes a service for copying (duplicating) the image of a document, etc., on a regular paper (regular copy service) and a service for copying the image of a photograph on a photo paper (photo copy service).

Figure 5:
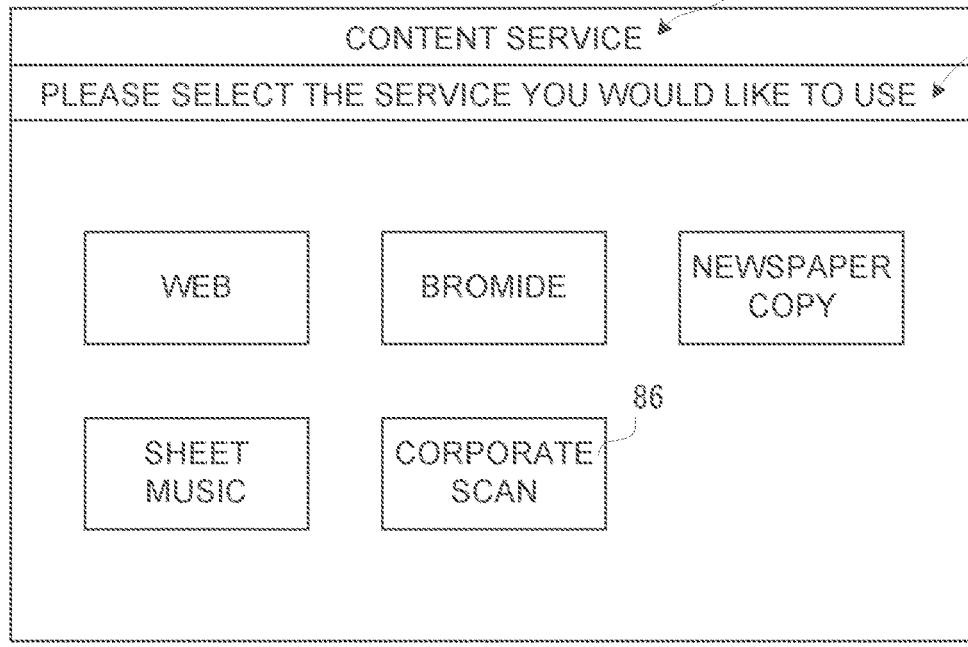
FIG. 5 is a schematic illustration showing one example of a service selection screen.

If the content service icon 78 is operated on the portal screen 74, i.e., the content service is selected as the function to be performed, the display 54 displays a service selection screen 80 as shown in FIG. 5, which is an operation screen for selecting a service provided by the selected function.

The service selection screen 80 includes a heading 82 notifying that the present screen is a screen for selecting a content service as the next step after operating the content service icon 78, and a message 84 urging the user to select a desired service.

In order to select the "Corporate Scan Service" to which this embodiment is directed, simply operate the corporate scan icon 86. The corporate scan service is a scan service available to a corporation (a member) that have contracted with a website providing this service, and allows the corporation to acquire scanned data (e.g., PDF data) obtained by scanning a document with use of the image processing apparatus 14 installed in a public space.

Note that the concept of "corporation" is not limited to general legal entities, and does not preclude treating one department of a corporation as "corporation". In this embodiment, although the case where the customer (user) is a corporation is described, the user is not necessarily limited to a corporation, but shall include all natural and legal persons who have contracted with the present scan service. In the following, the term "corporation" may be used as a user for convenience.

When the corporate scan icon 86 is operated, the display 54 displays a corporate login screen 88 as shown in FIG. 6. The corporate login screen 88 shows a message 90 urging the user to enter a user number. The user number (user ID) is a unique number assigned to each corporation, and is used for login authentication.

In order to allow the user number to be entered, the corporate login screen 88 is provided with alphanumeric keys 92. The user operates the alphanumeric keys 92 so as to enter the user number (user ID) in a user number entering space 94.

After entering the user number, the user operates a "Next" button 96 according to the message 90 to continue the login procedure. If the user wishes to discontinue the login procedure, simply operate an exit button 98.

FIG. 7 shows a scan screen 100 displayed at a time when the image processing apparatus 14 performs scanning. The scan screen 100 shows a message 102 that notifies the user what to do for the scanning process. The scan screen 100 is provided with set areas 104, 106, 108 and 110 used for setting parameters (properties) for the scanning process.

The set area 104 is used for setting a color mode, and allows the user to designate any one of "full color", "monochrome", etc., in a pull-down menu.

The set area 106 is used for setting a file saving format, and allows the user to designate any one of "PDF", "JPEG", etc., in a pull-down menu.

The set area 108 is used for setting a resolution, and allows the user to designate any one of "standard", "fine", etc., in a pull-down menu. Note that a specific numerical value, such as 600 pdi, 300 pdi, etc., can also be designated.

The set area 110 is used for setting a document size, and allows the user to designate any one of "A4", "B5", etc., in a pull-down menu.

Note that, as described below, in the corporate scan to which this embodiment is directed, it is not necessary to set the respective items in these set areas 104 to 110.

A depiction area 112 schematically shows a document rest and informs the user to place a document by utilizing the left corner of the document rest as a reference point.

The scan screen 100 also shows a document loading key 114 for instructing a document reading and an exit key 116 for stopping the scanning process.

Note that the document scanning is performed by the image reader 40 shown in FIG. 2.

In the case where the customer of the scanning service is a corporation, the leakage of company information due to an incorrect transmission, or unserviceable scan data resulted from errors in scan settings (color/monochrome, file extension, resolution, etc.), has been concerned. It has been also difficult to make a destination and operation settings for each scan format well known to each user in the corporation. The present embodiment provides a scanning service capable of eliminating the above inconveniences.

Figure 8:
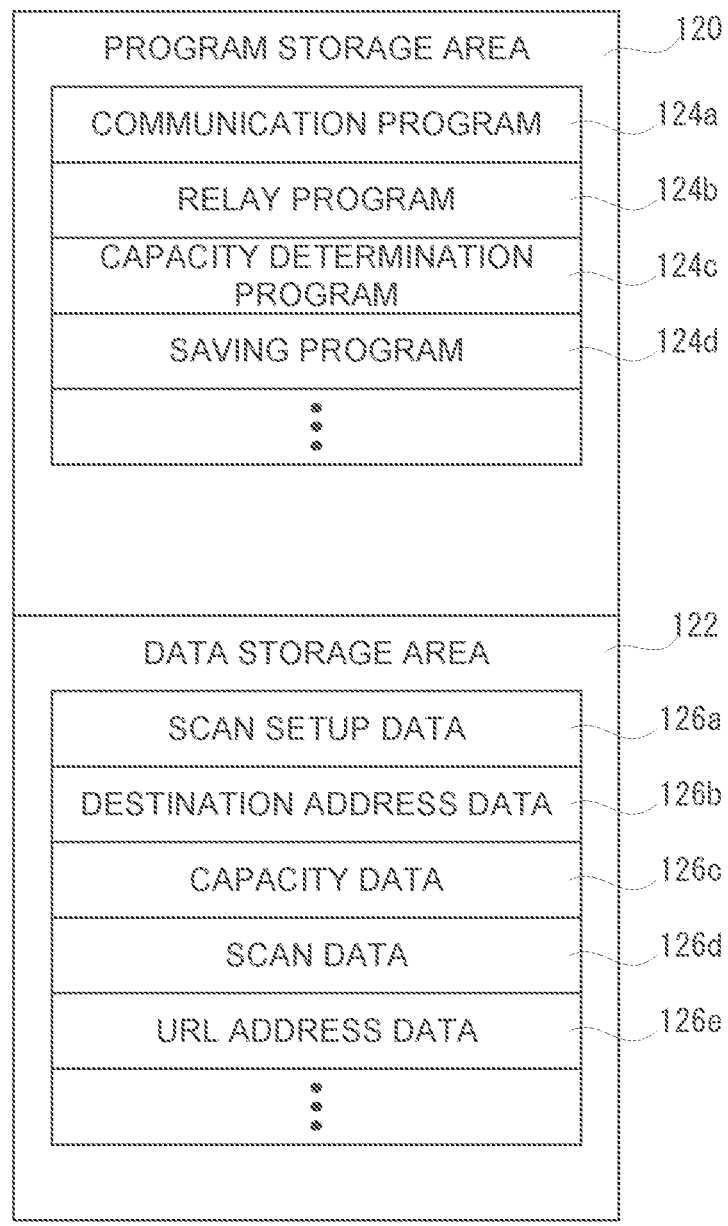
FIG. 8 is a schematic illustration showing one example of a memory map of RAM of the server shown in FIG. 3.

FIG. 8 is a schematic illustration showing one example of a memory map 118 of the RAM 60 of the relay server 12 shown in FIG. 3. As shown in FIG. 8, the RAM 60 includes a program storage area 120 and a data storage area 122. The program storage area 120 of the RAM 60 stores a control program for the server, including an operating system (OS). The control program for the server also includes a communication program 124a, a relay program 124b, a capacity determination program 124c, and a saving program 124d.

The communication program 124a is a program for communicating data with an external computer or other equipment, such as the image processing apparatus 14, via the network 16.

The relay program 124b is a program for relaying the image processing apparatus 14 and the download server 13. For example, when a user logs in to the image processing apparatus 14 through the corporate login screen 88, the image processing apparatus 14 transmits login information (user number (ID)) to the relay server 12 as user information, and upon receiving the login information, the relay server transmits scan setup data 126a and destination address data 126b (both described later) to the image processing apparatus 14 that performed the transmission of the login information.

The relay program 124b is also a program for receiving the scan data resulted from the execution in the image processing apparatus 14.

Furthermore, the relay program 124b is a program for saving the scan data from the image processing apparatus 14 to the storage device 13b of the download server 13, and for transmitting URL information of the save location of the storage device to the image processing apparatus 14 in accordance with the destination address data 126b.

The capacity determination program 124c is a program for determining whether the remaining capacity of the storage device 13b exists, or whether it exceeds a predetermined threshold. Note that the remaining capacity is indicated using capacity data preset in a capacity data area 126c described below.

The saving program 124d is a program for temporarily saving the scan data received from the image processing apparatus 14 in accordance with the relay program 124b in the data storage area 122 and thereafter transmitting the scan data to the download server 13 for the save in the download server 13.

Although not shown in the drawing, the program storage area 120 also stores programs for selecting and executing various functions provided in the relay server 12.

The data storage area 122 of the RAM 60 is provided with a scan setup data area 126a, a destination address data area 126b, a capacity data area 126c, a saving scan data area 126d, a URL address data area 126e, etc. It should be noted in advance that, in the following description, the term "area" may be omitted when referring to each area, and each data may be denoted by the same reference number as the corresponding area.

The scan setup data 126a is a database in which parameters (properties) shown in FIG. 7, i.e., the color mode, the file format and the resolution, are set in advance for each format of the document to be scanned. One example of the scan setup data 126a is shown in FIG. 9.

In the scan setup data 126a shown in FIG. 9, regarding Format A (as illustrated in FIG. 10, a document only containing texts is defined as Format A), for example, the color mode is set as "Monochrome Fixed", the file format is set as "PDF", and the resolution is set as "100-300 dpi Fixed". Note that the file format means the format of an output file resulting from the scanning.

Regarding Format B (as illustrated in FIG. 11, a document containing texts and at least one image is defined as Format B), for example, the color mode is set as "Color Fixed", the file format is set as "Highly Compressed PDF", and the resolution is set as "400 dpi Fixed".

Figure 12:
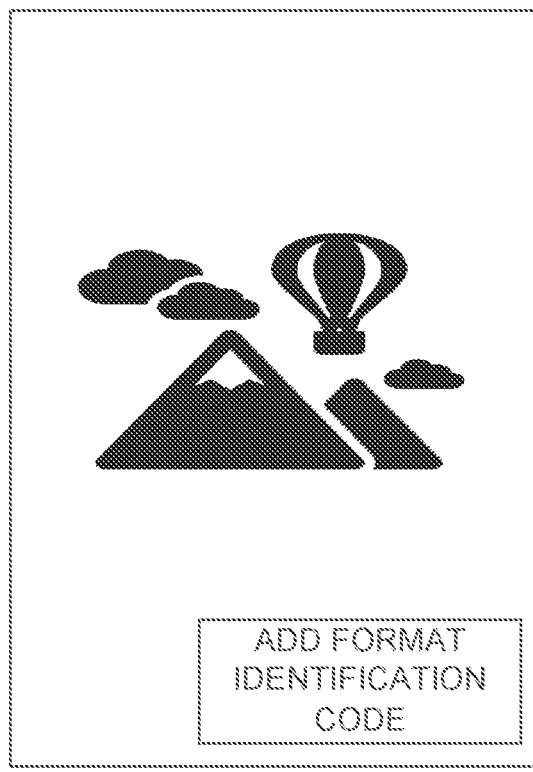
FIG. 12 is a schematic illustration showing one example of format C.

Regarding Format C (as illustrated in FIG. 12, a document only containing image(s) is defined as Format C), for example, the color mode is set as "Color Fixed", the file format is set as "JPEG", and the resolution is set as "300-400 dpi Fixed".

Note that, in the scan setup data 126a shown in FIG. 9, each of "Free (Text)" and "Free (Image)" means a handwritten document.

A detailed description of the other formats is omitted. A format identification code may be appended to each document. The format identification code is a character code such as alphanumeric characters, one-dimensional code (barcode), matrix type two-dimensional code (QR code (registered trademark)), etc., and designates the format of the relevant document in a way allowing a (visual or machine) recognition. Note that the image processing apparatus 14 determines which format the document belongs, and the determined format information is transmitted from the image processing apparatus 14 to the relay server 12.

The destination address data 126b is a database in which the email address of the destination for each format is set, one example of which is shown in FIG. 13.

For example, if a format is one of Format A, Format B, Format C and Free (Text), the format should be transmitted to, e.g., a wide-area sales department, and six email addresses AAA111@mail.com, AAA112@mail.com, AAA113@mail.com, AAA114@mail.com, AAA115@mail.com and AAA 111@mail.com are set as Destination Email Address. In this case, Download Condition designates that entering a password makes it possible to download the scan data from the download server 13.

For example, if a format is one of Format A and Free (Text), the format should be transmitted to, e.g., an urban sales department, and three email addresses BBB111@mail.com, BBB112@mail.com and BBB113@mail.com are set as Destination Email Address. In this case, Download Condition designates that entering a password makes it possible to download the scan data from the download server 13.

For example, if a format is one of Format A and Free (Text), the format should be transmitted to, e.g., a regional sales department, and two email addresses CCC111@mail.com and CCC112@mail.com are set as Destination Email Address. In this case, Download Condition designates that entering a password makes it possible to download the scan data from the download server 13.

Note that, in the destination address data 126b shown in FIG. 13, "ALL" means that all formats are applicable. The other examples in FIG. 13 are repetitive and will be omitted.

The scan setup data 126a illustrated in FIG. 9 and the destination address data 126b illustrated in FIG. 13 are set for each contractor (corporate). Therefore, as described later, when the login information is received from the image processing apparatus 14, the scan setup data 126a and the destination address data 126b, corresponding to the corporation indicated by the login information, are transmitted to the image processing apparatus 14.

Referring again to FIG. 8, the capacity data 126c represents data indicating the remaining capacity of the storage device 13b for saving the scan data, when the relay server 12 transfers, for saving, the scan data obtained by the image processing apparatus 14 to the storage device 13b (FIG. 1) of the download server 13. The relay server 12 may ascertain at suitable time the remaining capacity value through a suitable communication between the relay server 12 and the download server 13, or may inquire the download server 13 whenever necessary.

The saving scan data area 126d temporarily saves scan data obtained when a normal scanning service is performed without using the corporate scan used in the embodiment, or the scan data that is to be transferred to the download server 13 in the corporate scan service.

The URL address area 126e stores, as described above, the URL information (address) used for accessing the save location of the scan data, i.e., the corresponding storage location in the storage device 13b of the download server 13. The URL address may be changed so as to correspond to a download condition. For example, if both a destination address with a password designated for download and a destination address with no password designated are assigned for the same format, two URLs are prepared for two save locations for download.

Figure 14:
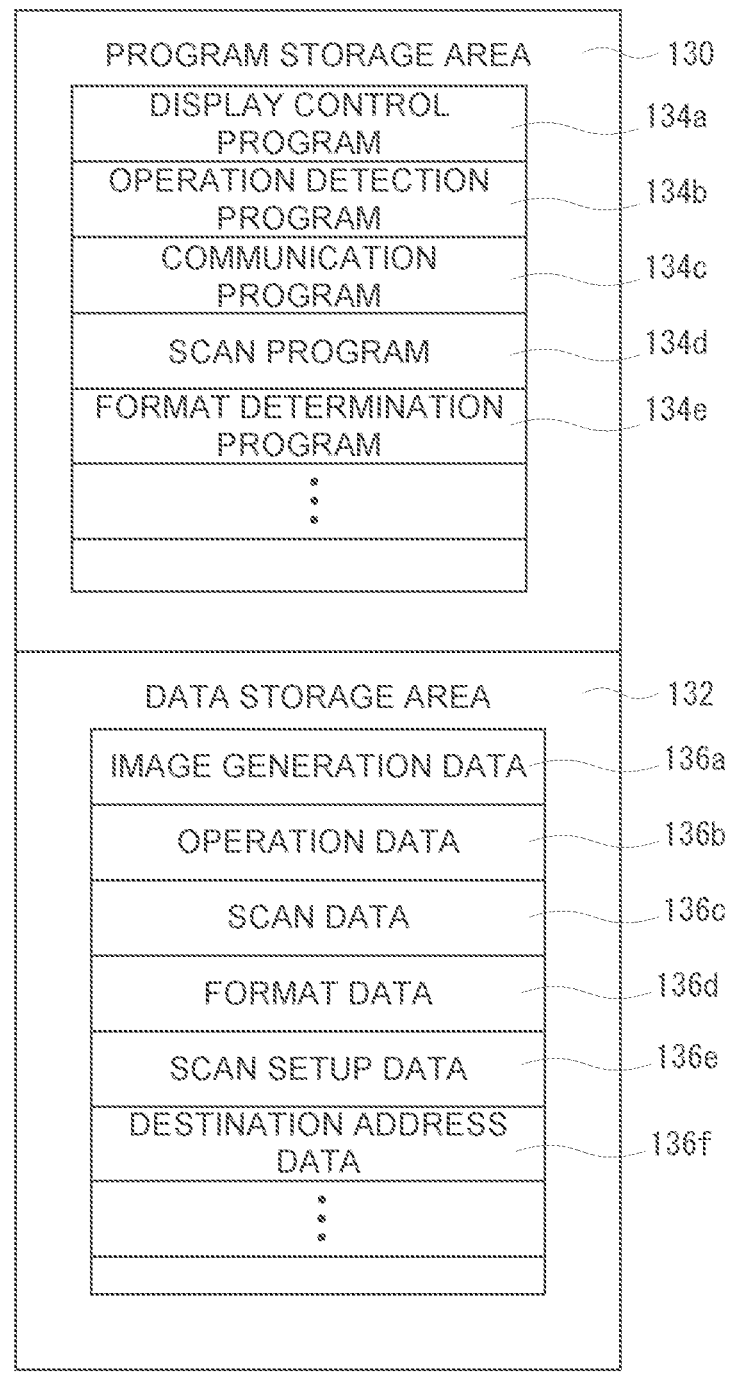
FIG. 14 is a schematic illustration showing one example of a memory map of RAM of the image processing apparatus shown in FIG. 2.

FIG. 14 is a schematic illustration showing one example of a memory map 128 of the RAM 24 of the image processing apparatus 14 shown in FIG. 2. As shown in FIG. 14, the RAM 24 includes a program storage area 130 and a data storage area 132. The program storage area 130 of the RAM 24 stores a control program for the image processing apparatus, including an OS. The control program for the image processing apparatus also includes a display control program 134a, an operation detection program 134b, a communication program 134c, a scan program 134d, and a format determination program 134e.

The display control program 134a is a program for generating display screen data necessary to display various screens on the screen of the display 54, based on image generation data 136a (described later), etc., and for making the display control circuit 30 control the display 54 to display images by using the display screen data.

The operation detection program 134b is a program for detecting operation data 136b (described later) corresponding to operations on the input device 52. For example, when a touch panel (not shown) is touched, the CPU 22 acquires touch coordinate data output from the touch panel as the operation data 136b in accordance with the operation detection program 134b, and stores the touch coordinate data in the data storage area 132 of the RAM 24.

The communication program 134c is a program for controlling the short-range communicator 38 and the communicator 50 to establish communication with the relay server 12, etc., through the network 16 (FIG. 1).

The scan program 134d is a program for scanning a document by the image reader 40 (FIG. 2) with, e.g., the scan screen 100 shown in FIG. 7.

The format determination program 134e is a program for prescanning a document and determining the format of the document listed in FIG. 9. Note that, if a format identification code (FIGS. 10 to 12) is appended to the document, the format identification code is read from the prescanned scan data and the format is thereby determined. The CPU 22 (FIG. 2) that executes the format determination process in accordance with the format determination program 134e functions as a format information detector.

Although not shown in the drawing, the program storage area 130 also stores other programs necessary for the operation of the image processing apparatus 14.

The data storage area 132 of the RAM 24 is provided with an image generation data area 136a, an operation data area 136b, a scan data area 136c, a format data area 136d, a scan setup data area 136e, and a destination address data area 136f, etc. It should be noted in advance that, in the following description, the term "area" may be omitted when referring to each area, and each data may be denoted by the same reference number as the corresponding area.

The image generation data 136a represents data, such as polygon data or texture data, used for generating the display image data corresponding to the various screens to be displayed on the display 54. The image generation data 136a also includes image data corresponding to software keys, image generation data for displaying each screen described below, and so on.

The operation data 136b represents data detected in accordance with the operation detection program 134b, and is stored in chronological order. Note that the operation data 136b is deleted after being used for the processing in the CPU 22.

The scan data 136c represents data resulting from scanning (including prescanning) the document by the image reader 40 (FIG. 2).

The format data 136d represents data indicating the format determined by the format determination program 134e.

The scan setup data 136e represents data transmitted from the relay server 12 and received in accordance with the communication program 134c, and is the scan setup data such as the color mode shown in FIG. 9.

The destination address data 136f represents data transmitted from the relay server 12 and received in accordance with the communication program 134c, and is, e.g., the destination address data shown in FIG. 13.

When the image processing apparatus 14 transmits the login information to the relay server 12, the image processing apparatus 14 receives the scan setup data 126a and the destination address data 126b, for the user indicated by the login information, transmitted from the relay server 12, and stores the received scan setup data 126a and destination address data 126b in the data storage area 132.

Although not shown in the drawing, the data storage area 132 may also store other data necessary for the execution of the control program for the image processing apparatus, or may also be provided with a timer (counter) and a register, necessary for the execution of the control program for the image processing apparatus.

Figure 15:
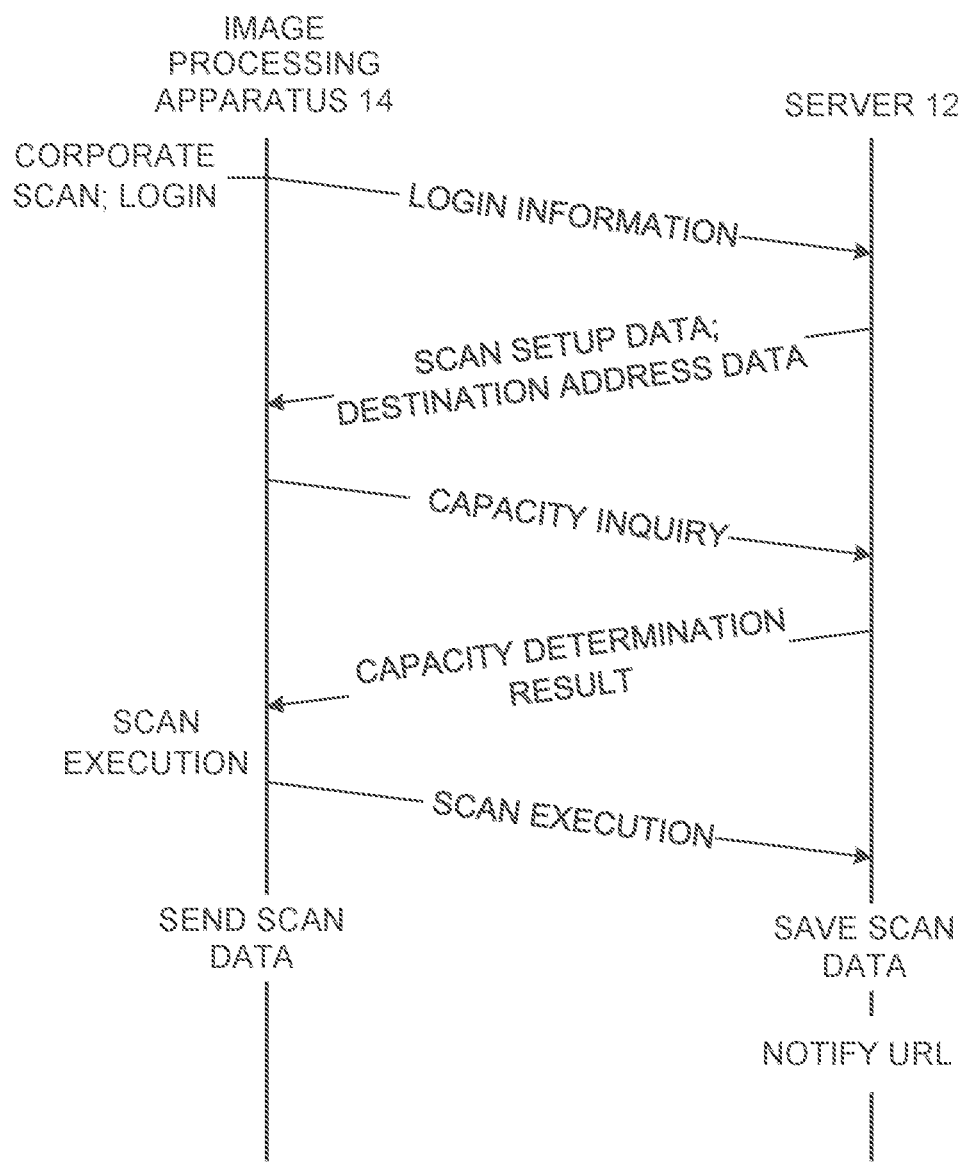
FIG. 15 is a schematic illustration showing outline of a series of operations in the embodiment.

FIG. 15 is a schematic illustration generally showing the operation of the image processing system 10 (FIG. 1) according to the embodiment. When a corporate login is executed on the image processing apparatus 14 on the corporate login screen 88 illustrated in FIG. 6, the image processing apparatus 14 transmits login information (user number (ID)) as user information to the relay server 12.

Upon receiving the login information from the image processing apparatus 14, the relay server 12 transmits the scan setup data 126a (FIG. 9) and the destination address data 126b (FIG. 13), inherently set to a user (corporation) indicated by the login information, to the image processing apparatus 14.

The image processing apparatus 14 prescans the document to read the identification code of a format and executes a scanning in accordance with the scan setup data corresponding to the format.

The data volume of the scan data is then transmitted to the relay server 12, and the relay server 12 determines how much the data volume of the scan data is, relative to the remaining capacity of the storage device 13b of the download server 13. The result of determination is transmitted from the relay server 12 to the image processing apparatus 14.

Depending on the result of the capacity determination, the image processing apparatus 14 transmits the scan data directly to a destination indicated by the destination address data, or alternatively to the relay server 12.

The relay server 12 transfers the scanned data to the download server 13 for saving, and notifies the URL information (address) of the save location to the image processing apparatus 14.

Figure 16:
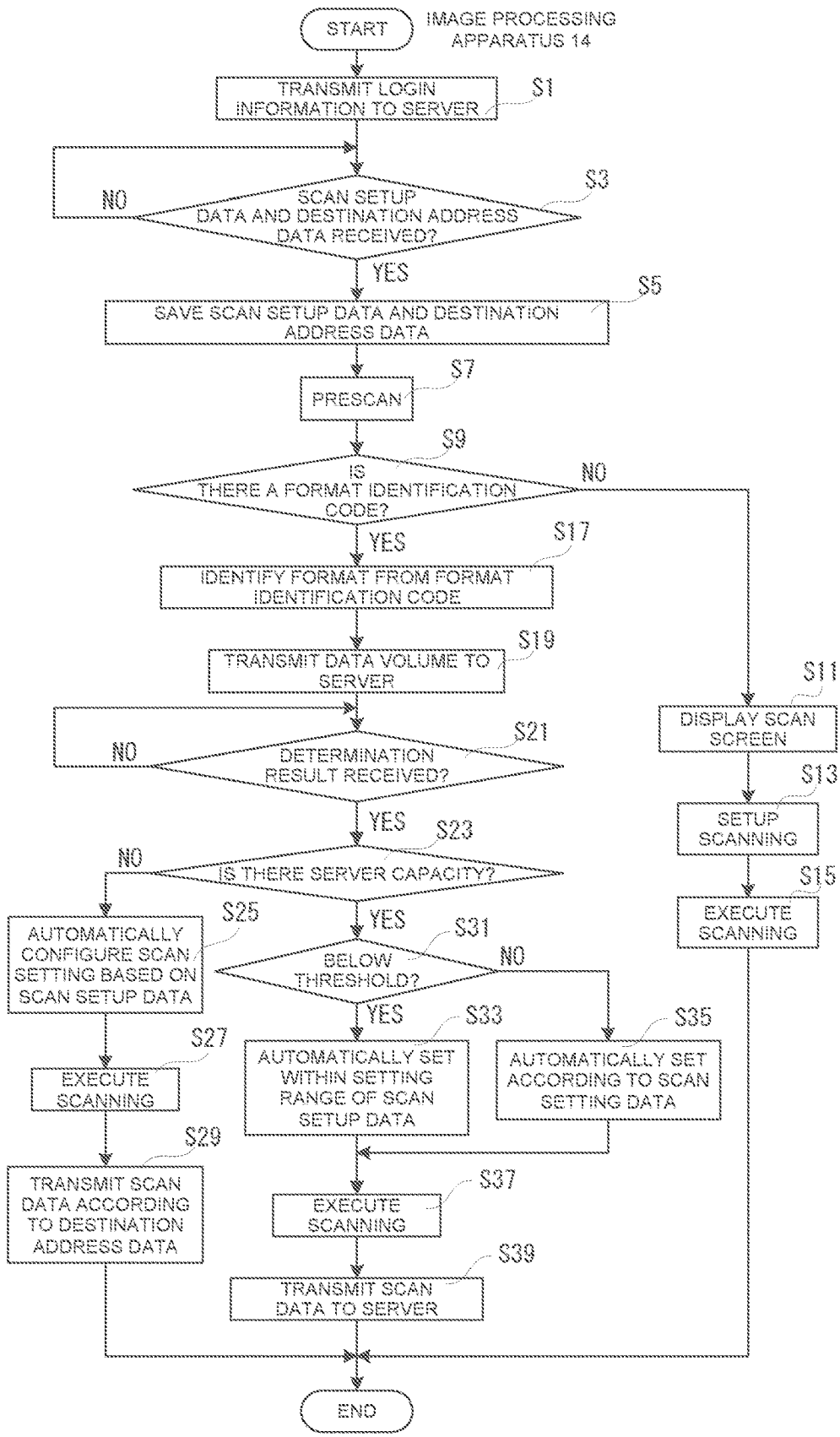
FIG. 16 is a flow chart showing one example of operation of the image processing apparatus shown in FIG. 2.

FIG. 16 is a flow chart showing one example of the detailed operation of the image processing apparatus 14 shown in FIG. 2, according to the above general operation. In this embodiment, the operation of the image processing apparatus 14 starts when the user logs in using the login screen 88 shown in FIG. 6.

As shown in FIG. 16, the CPU 22 of the image processing apparatus 14 transmits, at step S1, the login information (user information), entered when the user logged in, to the relay server 12. The CPU 22 (FIG. 2) executing step S1 functions as a login information (user information) transmitter.

After sending the login information from the image processing apparatus 14 to the relay server 12, the relay server 12 transmits the scan setup data and the destination address data as previously explained, and thus the image processing apparatus 14 waits until those data are received (step S3).

At step S5, the received scan setup data and destination address data are stored in the data storage area 132 (FIG. 14).

At step S7, the CPU 22 operates to display the scan screen shown in FIG. 7, and control the image reader 40 to scan (prescan) a document placed on a document rest. The scan settings at this time use previously defined parameters or properties.

Then, at step S9, the CPU 22 operates to temporarily store the prescanned scan data in the data storage area 132, and determine whether a format identification code (FIGS. 10 to 12) is included in the scan data in accordance with the format determination program 134e.

If the format identification code is not included, the decision of step S9 is "NO", and the operation proceeds to next step S11. The CPU 22 operates to display, at step S11, the scan screen 100 shown in FIG. 7, setup, at step S13, the scanning in accordance with the user's parameter settings 104 to 110, and execute, at step S15, the scanning. Note that the series of scanning operations at steps S11 to S15 is not a characteristic feature of the embodiment.

If the decision of step S9 is "YES", the format is identified at next step S17, based on the format identification code detected at step S9 or the prescanned scan data.

Then, at step S19, the CPU22 operates to transmit the data volume of the scan data, detected in the previous prescanning, to the relay server 12 for the capacity determination in the relay server 12.

When the data volume is transmitted from the image processing apparatus 14, the relay server 12 operates, as previously explained in general, to determine whether the remaining storage capacity of the download server 13 exceeds the threshold, and the determination result is notified to the image processing apparatus 14. Thus, the image processing apparatus 14 waits to receive the determination result from the relay server 12 (step S21).

At step S23, the CPU 22 operates to determine whether the download server 13 has a remaining capacity sufficient for storing the scan data, based on the determination result from the relay server 12. More specifically, at step S23, the CPU determines whether there is a capacity remaining in the storage device 13b of the download server 13.

The decision "NO" at step S23 means that the download server 13 has no remaining capacity, and in this case the operation of the CPU 22 proceeds to step S25.

At step S25, based on the scan setup data saved at step S5, scan settings (parameters), according to the format identified at step 17, are automatically configured.

Then, at step S27, the CPU22 operates to control the image reader 40 to scan the document already placed on the document rest at step S7, and stores the scan data in the data storage area 132.

Then, at step S29, the CPU 22 operates to control the communicator 50 to transmit the scan data to a destination indicated by the destination address data stored in the data storage area 132 at step S5. Thus, it is possible to automatically transmit the scan data to the corporation logged in at step S1. The CPU 22 executing step S29 functions as a first transmitter.

In this way, the scan data is automatically transmitted to the destination in accordance with the destination address data, so that the possibility of erroneous transmission is effectively reduced.

If the determination at step S23 is that there is a remaining capacity, the decision of step S23 is "YES", and then the CPU 22 operates, at step S31, to determine whether the remaining capacity of the storage device 13b of the download server 13 is less than or equal to a predetermined threshold value (e.g., a residual capacity corresponding to the data amount of the scan data (step S19)).

If the decision of step S31 is "YES", i.e., when the remaining capacity is less than or equal to the predetermined threshold, the CPU 22 operates to automatically set or configure scan settings within the range of parameters (items) indicated by the scan setup data stored in the storage area 136e. For example, when the remaining capacity of the download server 13 is low, the resolution (definition) is set to be reduced.

That is, when the capacity of the storage device of the download server 13 is less than or equal to the predetermined threshold, the scan settings (file format, resolution, etc.) are automatically changed to keep the data amount of the scanning below the threshold.

For example, when the document is "Format A", the resolution is set at "100-300 dpi". If the decision of step S31 is "YES", the scanning at the upper limit "300 dpi" will exceed the threshold. Therefore, in this embodiment, the resolution is set within the range of resolution of 100-300 dpi previously set in accordance with the format. If the resolution in the prescanning at step S7 is, e.g., 100 dpi, then it is possible to calculate how many times it can be multiplied to get a resolution within the range of 100-300 dpi, so that the setting of the resolution can be determined based on such a calculation. For example, based on the amount of data at the time of prescanning, the maximum possible resolution within the set range (100-300 dpi) is set at 200 dpi.

If the decision of step S31 is "NO", i.e., when the remaining capacity of the storage device 13b of the download server 13 is greater than the threshold, the CPU 22 operates, at step S35, to automatically set parameters for scanning in accordance with the scan setup data 136e.

In either case of step S33 or S35, the CPU 22 operates, at next step S37, to control the image reader 40 in accordance with the scan program 134d, and execute the scanning according to the scan setup data (properties) set for each case. The resulting scan data is stored in the data storage area 132 (FIG. 14). Thus, the scanning is executed in accordance with the scan setup data automatically set at step S33 or step S35, so that the user does not have to set scan parameters (properties) each time, and thereby the user's effort is effectively reduced.

Then, at step S39, the CPU 22 operates to transmit the scan data to the relay server 12 in accordance with the communication program 134c. The CPU 22 executing step S39 functions as a second or scan data transmitter.

Figure 17:
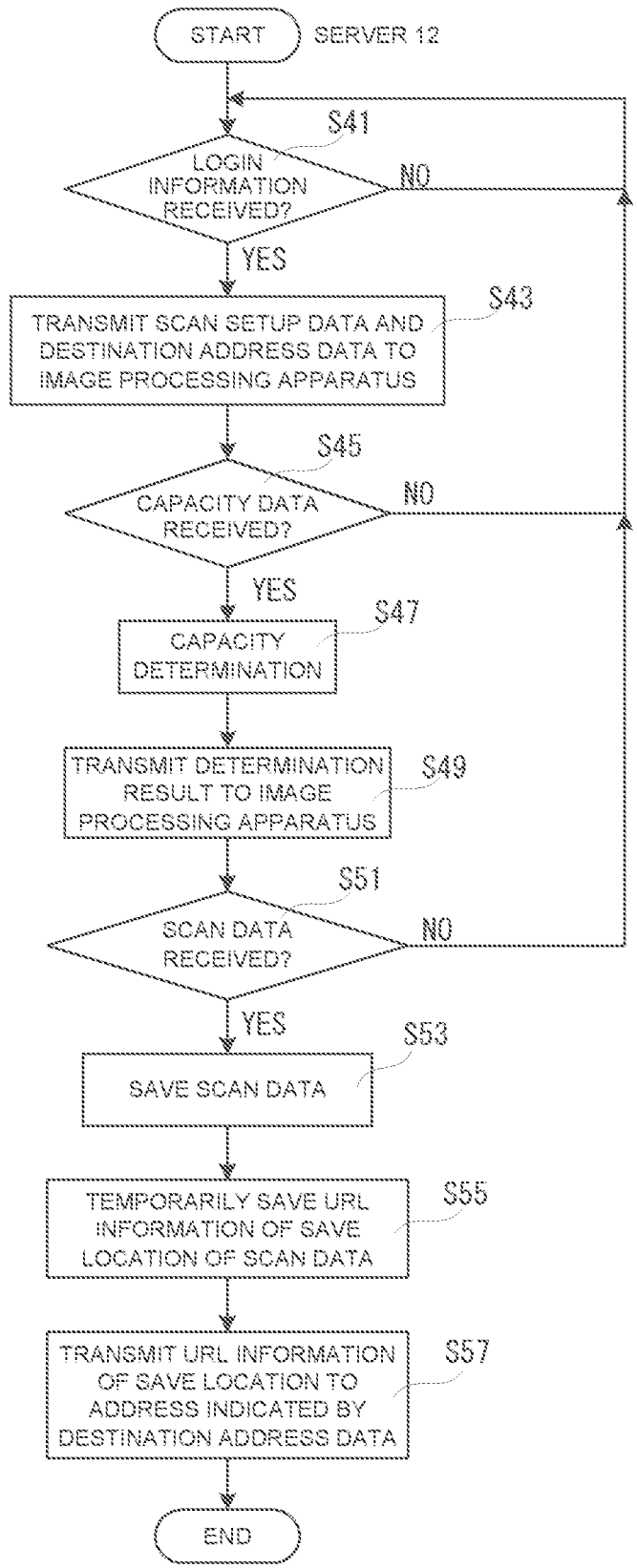
FIG. 17 is a flow chart showing one example of operation of the server shown in FIG. 3.

Next, referring to FIG. 17, the operation of the relay server 12 cooperating with the image processing apparatus 14 is described.

When the CPU 58 of the relay server 12 receives the login information (user information) from the image processing apparatus 14 through the communicator 68 (step S41), the CPU 58 operates, at subsequent step S43, to transmit the scan setup data and the destination address data, which correspond to the user (corporation) indicated by the user information and are previously set in the data storage area 122 of the RAM 60 (FIG. 8), to the image processing apparatus 14.

Thereafter, when the reception of the capacity data transmitted by the image processing apparatus 14 at step S19 is confirmed at step S45, the CPU 58 operates, at next step S47, to determine whether there is a capacity remaining in the download server 13 that stores the scan data, of which data amount is predicted by the prescanning in the image processing apparatus 14, and if there is a remaining capacity, determine that the remaining capacity is less than or equal to the threshold or alternatively that the remaining capacity exceeds the threshold, according to the capacity determination program 124c.

Note that the threshold of the remaining capacity can be determined for the entire storage device 13b of the download server 13, or determined individually based on the terms and conditions for each contracted corporation.

Then, at step S49, the determination result is transmitted to the image processing apparatus 14.

When it is determined, at step S51, that the scan data transmitted by the image processing apparatus 14 at step S39 has been received, the CPU 58 operates, at step S53, to temporarily save the scan data in the data storage area 122 (save scan data area 126*d*), and control the communicator 68 in accordance with the relay program 124*b* so as to transmit the scan data to the download server 13 and make the scan data stored in the storage device 13*b*.

Then, the CPU 58 operates, at step S55, to create the URL information of the save location, i.e., one or more addresses ("https." data) allowing an access to the storage device 13*b* of the download server 13 (FIG. 1) in this embodiment, and temporarily store the URL information in the URL address data area 126*e* (FIG. 8).

Then, the CPU 58 operates, at step S57, to transmit the temporarily stored one or more URL address data to one or more destinations indicated by the destination address data by, e.g., email.

Thus, the destination, i.e., the user receiving the scan data, can click on the download URL sent by email and thereby access the storage device 13*b* of the download server 13. The CPU 58 of the download server 13 then operates to determine whether the download conditions entered by the destination, such as presence or absence of password, login information, device information, etc., have been met. When the download conditions are determined to be met, it becomes possible to download the scan data from the storage device 13*b* of the download server 13.

In the embodiment described above, upon operating the icon 86 of corporate scan service on the service selection screen 80 transitioned from the portal screen (function selection) 74 shown in FIG. 4, the corporate login screen 88 shown in FIG. 6 is then called up on the display 54.

Figure 18:
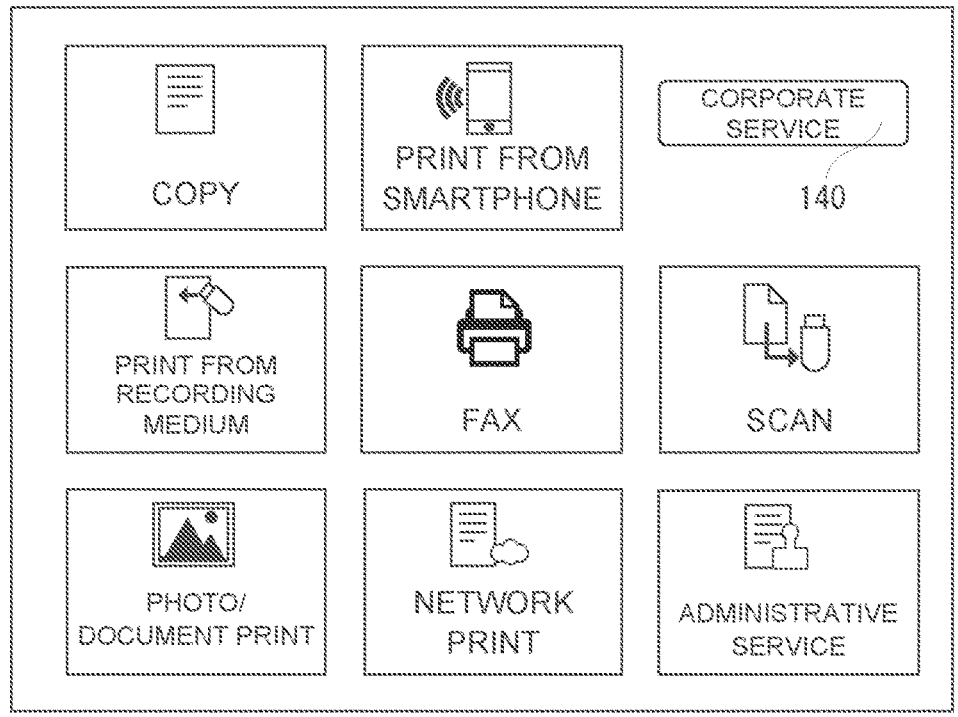
FIG. 18 is a schematic illustration showing another example of a service selection screen.
Figure 19:
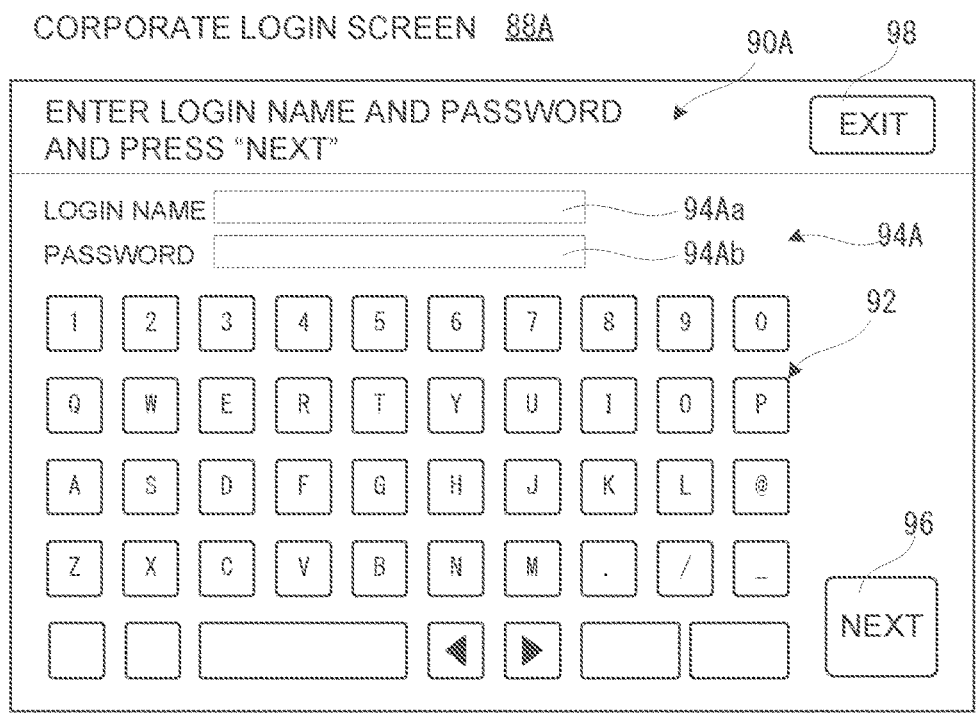
FIG. 19 is a schematic illustration showing another example of a corporate login screen.

In contrast, a portal screen 138 shown in FIG. 18 is provided with a corporate service button 140 that, when operated, immediately calls up the corporate login screen 88A shown in FIG. 19. In the corporate login screen 88A shown in FIG. 19, a number entry area 94A is provided, and a login name and a password can be entered into the respective input areas 94Aa and 94Ab by operating the alphanumeric keys 92.

In the above embodiment, the download server 13 is provided to store the scan data separately from the relay server 12 and allow the destination to download the scan data. However, the function of the download server 13 may be incorporated into the relay server 12. In the embodiment where the download server 13 is provided, the storage device 13*b* of the download server 13 functions as the save location of the scan data. In contrast, when the function of the download server 13 is incorporated in the relay server 12, the RAM 60 of the relay server 12 functions as the save location of the scan data.

Further, in the above embodiment, the relay server 12 transmits the scan setup data and the destination address data to the image processing apparatus 14 each time a user logs into the image processing apparatus 14. However, at least one of the scan setup data and destination address data may be previously set in the image processing apparatus 14.

Note that the specific configurations, etc., described in the above embodiments are merely examples, and can be changed as appropriate for actual products. Furthermore, the processing order of steps in the flow chart shown in the above embodiment can be changed as needed, as long as equivalent results are obtained.

What is claimed is:

1. An image processing system comprising an image processing apparatus and a server, the image processing apparatus providing a scanning service to a user, wherein:
the image processing apparatus is provided with a user information receiver that receives user information of the user,
the server is provided with a scan setup data storage that previously sets scan setup data corresponding to the user indicated by the user information,
the image processing apparatus further transmits the user information to the server,
the server further transmits the scan setup data corresponding to the user indicated by the user information to the image processing apparatus,
the image processing apparatus is further provided with:
a document format information detector that detects document format information;
an image reader that reads a document and generates scan data, in accordance with the scan setup data that is based on the user information and the document format information, when the user information is received and the document format information is detected by the document format information detector; and
a scan data transmitter that transmits the scan data generated by the image reader to the server, wherein
the server is further provided with a destination address data storage that previously sets destination address data corresponding to a user, and
the server further saves the scan data transmitted from the scan data transmitter at a save location and transmits a Uniform Resource Locator (URL) address of the save location to a destination indicated by the destination address data.

2. The image processing system of claim 1, wherein
the image processing apparatus is further provided with a second destination address data storage that stores a destination address of the scan data corresponding to the user indicated by the user information; and
the scan data transmitter transmits the scan data generated by the image reader to a destination indicated by the destination address data storage.

3. The image processing system of claim 1, wherein
the document format information detector detects the document format information based on the scan data obtained by prescanning the document.

4. The image processing system of claim 1, wherein a format identification code is recognizably provided on the document to allow the document format information detector to identify a format of the document.

* * * * *